United States Patent [19]
Suda et al.

[11] Patent Number: 5,381,488
[45] Date of Patent: Jan. 10, 1995

[54] CHARACTER READING APPARATUS

[75] Inventors: Masato Suda; Yoshikatu Nakamura; Nobuaki Takagi, all of Tokyo, Japan

[73] Assignee: Kabushiki Kaisha Toshiba, Tokyo, Japan

[21] Appl. No.: 786,046

[22] Filed: Oct. 31, 1991

[30] Foreign Application Priority Data

Oct. 31, 1990 [JP] Japan .................................. 2-291733
Mar. 22, 1991 [JP] Japan .................................. 3-059087

[51] Int. Cl.$^6$ ............................................. G06K 9/38
[52] U.S. Cl. ............................................. 382/9; 382/53
[58] Field of Search ................ 382/9, 18, 53; 358/462

[56] References Cited

U.S. PATENT DOCUMENTS

| | | | |
|---|---|---|---|
| 4,377,803 | 3/1983 | Lotspiech et al. | 382/18 |
| 4,461,027 | 7/1984 | Ikeda et al. | 382/9 |
| 4,466,612 | 8/1984 | Damen et al. | 382/9 |
| 4,547,811 | 10/1985 | Ochi et al. | 382/9 |
| 4,741,046 | 4/1988 | Matsunawa et al. | 382/9 |
| 4,809,343 | 2/1989 | Wakabayashi et al. | 382/53 |
| 4,905,294 | 2/1990 | Sugiura et al. | 382/9 |
| 4,926,492 | 5/1990 | Tanaka et al. | 382/18 |

*Primary Examiner*—Leo H. Boudreau
*Assistant Examiner*—Chris Kelley
*Attorney, Agent, or Firm*—Cushman, Darby & Cushman

[57] ABSTRACT

A character reading apparatus optically reads a recording medium and stores an image information as multi-value image in the multi-value image memory (3). The image information stored in the multi-value image memory (3) is scanned in the horizontal direction (character line direction). The maximum value for the pixel data of each line is detected by maximum density value extraction unit (4). When all the scanning in the horizontal direction has been completed, maximum value data (A1) is obtained. Differential data (A2) is obtained by differentially processing this maximum value data (A1), and a domain is obtained as the height of the character line. When the height of the character line have been obtained, the image information of the multi-value image memory (3) is scanned in the vertical direction. As in the horizontal direction, the maximum values for each scan in the vertical direction are extracted by maximum density value extraction unit(4). When all the scanning in the vertical direction has been completed, maximum value data (B1) is obtained. Differential data (B2) is obtained by differentially processing maximum value data (B1). The position of each character is obtained from differential data (B2). Then, character identification is executed by sending the portion of the multi-value image information within the domains of the character line and character positions to the character identification unit (6).

3 Claims, 7 Drawing Sheets

CHARACTER READING APPARATUS

BACKGROUND OF THE INVENTION

1. Field of the Invention

This invention relates to a character reading apparatus which optically reads characters recorded on a recording medium. In particular, the present invention provides a technique of detecting each character field from a character image which has been read.

2. Description of the Related Art

An example of such a character reading apparatus is shown in U.S. Pat. No. 4,461,027 (Patented Jul. 17, 1984). The character reading apparatus gets a character image by reading the recording medium through an optical scanner. This character image is input into a multi-value pattern memory for character identification after being A/D converted. Also, after the character image has been digitally converted, it is input into a 1-bit pattern memory and the character position of each character is detected by taking projections of the character image in the horizontal and vertical direction.

However, this type of character line and character position detection technique has the following disadvantages. Namely, if the density level of a recorded character is low at certain positions on the character, the image may be lost in the digital conversion stage. Therefore, the character line and character position cannot be detected correctly. Consequently, a complete character image cannot be obtained and, as a result, identification of the character is impossible.

In order to resolve the above-mentioned disadvantages, there exists a technique of extracting a plurality of digitally converted images which have been digitally converted at different levels and detecting the character line and character position in each of the respective digitally converted images. Each line and position of the image at each level is detected, and an image comprising the levels best detected is identified. However, the amount of circuitry necessary to perform this technique is extremely large.

SUMMARY OF THE INVENTION

It is an object of the present invention to provide a character reading apparatus capable of correctly detecting character line and character position without adversely effecting character identification.

The character reading apparatus according to this invention comprises circuitry for obtaining, from the recording medium, character images and representing these character images as pixels arranged in a plurality of lines and columns. Each pixel has a value within a predetermined range of values. The apparatus comprises circuitry for extracting peak values of each pixel line by comparing the pixels in each line and then determines the amount of lines, of the plurality of lines, which comprise the characters. The apparatus further comprises a processing unit which identifies the characters by processing the pixels within the amount of lines which are determined to comprise the characters.

A second embodiment of the invention further comprises circuitry for extracting peak values of each column of pixels within the range of pixel lines determined to comprise the characters. The processing unit identifies the characters by processing the pixels within the portion of the lines and columns determined to comprise the characters.

An additional embodiment of the invention further comprises circuitry for grouping the plurality of columns into a plurality of groups. The apparatus determines the peak values of the pixels in the portion of the lines within each group and determines the amount of lines in each group which comprise portions of the character images. The apparatus determines an average range of the amount of lines in each group and the processing unit identifies the characters by processing the pixels present within this average range of lines.

BRIEF DESCRIPTION OF THE DRAWINGS

Embodiments of this invention will now be described with reference to the accompanying drawings wherein.

DETAILED DESCRIPTION OF THE PREFERRED EMBODIMENTS

Figure 1:
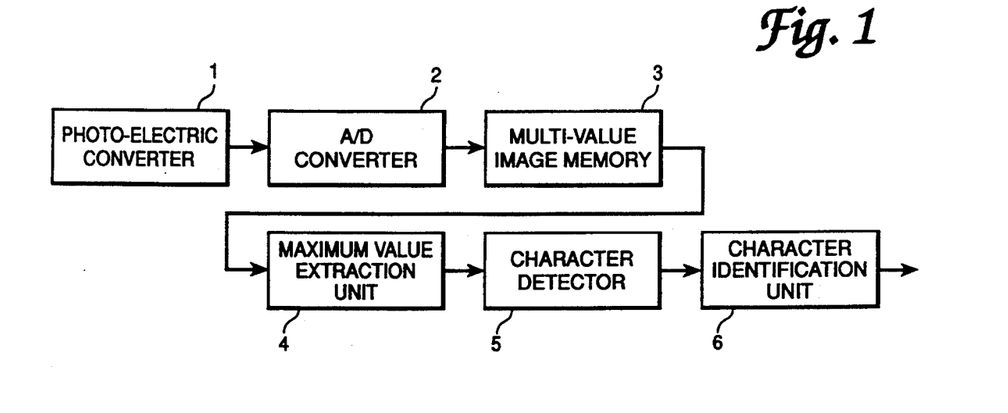
FIG. 1 is a block diagram showing an embodiment of the present invention.
Figure 5:
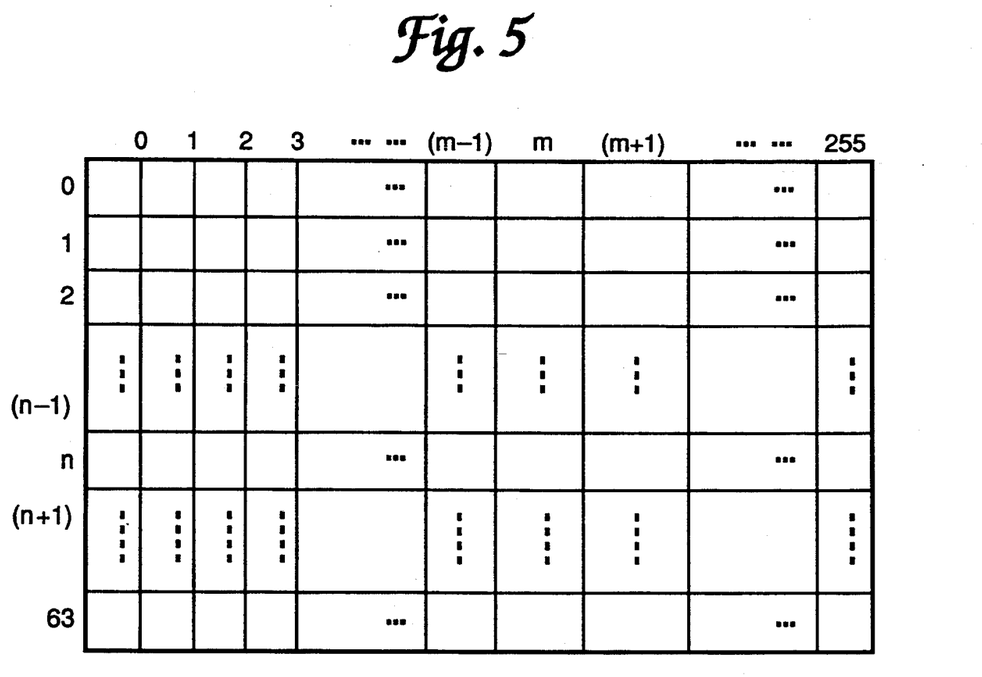
FIG. 5 is a table map of the multi-value image memory.

Referring to FIG. 1, photo-electric conversion unit (1) comprises a light source which irradiates light on a recording medium on which characters are recorded, a photo-electric converter such as a CCC (Charge Coupled Device) sensor which receives reflected light from the recording medium and converts the received light into electrical signals, and optical systems which direct light from the light source to the recording medium and reflected light from the recording medium to the photo-electric converter. The photo-electric conversion unit (1) converts character images into electrical signals (analog signals) by scanning the recording medium. The analog electrical signals from the photo-electric conversion unit (1) are converted to multi-value digital signals in an A/D conversion unit (A/D converter) (2). The multi-value digital signals converted in the A/D conversion unit (2) are stored in a multi-value image memory (3) as character images. The multi-value image memory (3) is constructed as shown in FIG. 5. The maximum density values for the character images stored in the multi-value image memory (3) are extracted in a maximum density value extraction unit (4). Then, the areas of each character unit are detected in a character detection unit (5) based on the maximum density values extracted in the maximum density value extraction unit (4). The character units are identified in character identification unit (6) based on the multi-value images of the areas detected by the character detection unit (5).

Figure 2:
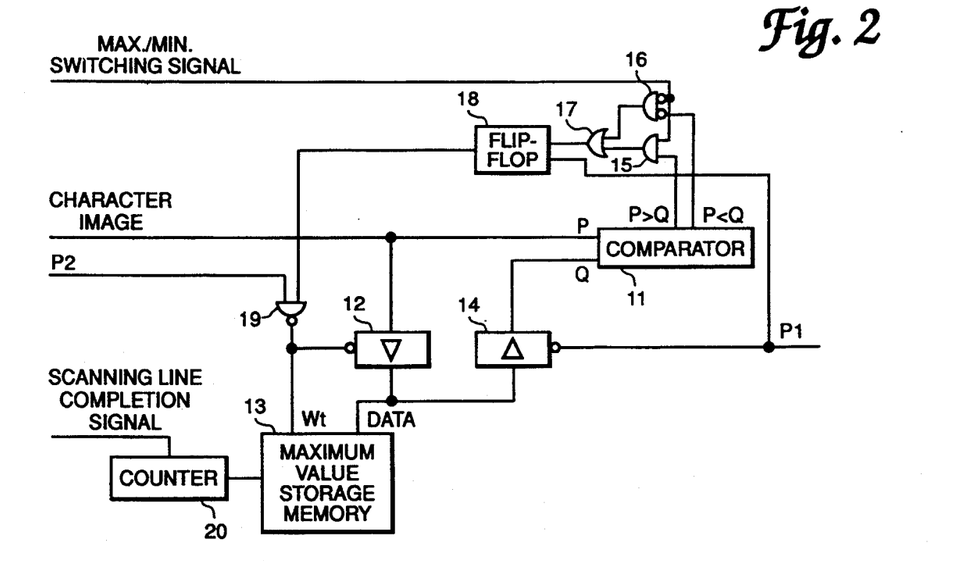
FIG. 2 is a block diagram of the maximum density value extraction unit shown in FIG. 1.
Figure 3:
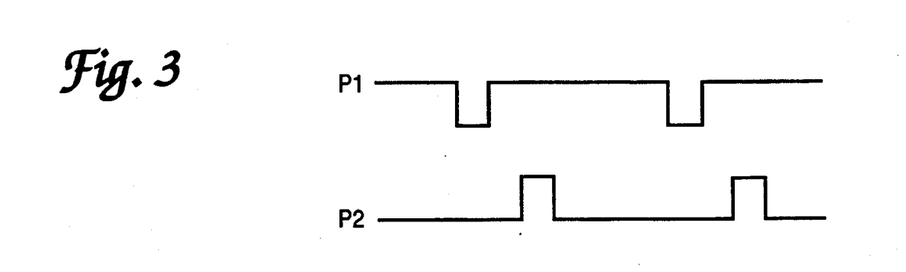
FIG. 3 is a time chart used in FIG. 2.

The maximum density value extraction unit (4) is described in detail in FIG. 2. The following description uses a maximum density value as an example. Namely, pixel data of a character image from the multi-value image memory (3) is derived one by one by scanning in a horizontal direction (see FIG. 5: 0,1,..m..,255) and is supplied to input terminal P of a comparator (11). The pixel data of the character image is also supplied to a maximum value storage memory (13) via 1st gate (12). At the same time, the output of the maximum value storage memory (13) is supplied to the other input terminal Q of the comparator (11) via 2nd gate (14). Then, one output (P<Q) of the comparator (11) is supplied to the "set" input of a Flip-Flop circuit (18) via AND gate (15) and OR gate (17). Also, the other output (P<Q) of the comparator (11) is supplied to the "set" input of the Flip-Flop circuit (18) via NAND gate (16) and OR gate (17). A pulse P1, as shown in FIG. 3, is supplied to the "reset" input of the Flip-Flop circuit (18), and the output of the Flip-Flop circuit (18) is supplied to one input of NAND gate (19). A pulse P2, as shown in FIG. 3, is supplied to the other input of NAND gate (19). The output of NAND gate (19) is supplied as the write signal (Wt) to the maximum value storage memory (13) while, at the same time, it is supplied to the control input of 1st gate (12). The pulse P1, as shown in FIG. 3, is supplied to the control input of 2nd gate (14). Also, a maximum/minimum switching signal is supplied to the other inputs of AND gate (15) and NAND gate (16). (The following description refers to an example for extracting the maximum value only. Therefore the maximum/minimum switching signal is "1").

Furthermore, the output of counter (20) is supplied to an address of the maximum value storage memory (13). The counter (20) is designed to be incremented by the scanning line completion signal of the multi-value image memory (3) (see FIG. 5).

Next, the operation of the circuit shown in FIG. 2 is described. First, the pixel data from the multi-value image memory (3) is supplied to input P of the comparator (11) in accordance with the timing of pulse P1. At this time, the Flip-Flop circuit (18) is reset by the pulse P1. The pulse P1 is also supplied to the control input of the 2nd gate (14), and then the content of the maximum value storage memory (13) is read. The content of the maximum value storage memory (13) is "0" initially. The maximum value which has been read is supplied to input Q of comparator (11). Comparator (11) compares the inputs P and Q. When P is greater than Q, the Flip-Flop (18) is set via AND gate (15) and OR gate (17). The pulse P2 is supplied to NAND gate (19) while the Flip-Flop (18) is in a set state. Then, NAND gate (19) opens the 1st gate (12), and the value of the pixel data from the multi-value image memory (3) is supplied to the maximum value storage memory (13) via 1st gate (12). Also, since write signal (Wt) is supplied at this time, the value of the pixel data is stored in the maximum value storage memory (13).

When the result of the comparison in the comparator (11) is P<Q, in the other words, when the value of the pixel data stored in the maximum value storage memory (13) is greater than the pixel data of the character image, the Flip-Flop (18) will not be set. Therefore, the pixel data of the character image is not written into the maximum value storage memory (13). The above operation is executed for all the pixel data of one scanning line in the horizontal direction (character line direction) of the multi-value image memory (3) (see FIG. 5). As a result, the maximum value in one scanning line is stored in the maximum value storage memory (13) on completion of one scan.

When the processing of one scanning line is completed, the counter (20) is incremented by the scanning completion signal, and the address of the maximum value storage memory (13) is also adjusted. Then, the maximum value for the next scanning line is stored. When the maximum values for all scanning lines in the horizontal direction have been stored in the maximum value storage memory (13), the maximum value data are as shown at (A1) in FIG. 4. Thereafter, differential data (A2) is obtained in the character detection unit (5) by differentially processing the extracted maximum value data (A1). The character line is detected from the maximum value of the differential data (A2).

After the character line is detected, the memory content of the maximum value storage memory (13), shown in FIG. 2, is temporarily cleared. Then, the content of the multi-value image memory (3) is scanned for the vertical direction (see FIG. 5: 0,1,..n..,63), and the maximum value for every scan is obtained. Since the height of the character line in the horizontal direction has been obtained as described above, each scan in the vertical direction need only be executed within the height of the character line. As the result of this scan in the vertical direction, maximum value data are obtained at (B1) as shown in FIG. 4.

Figure 4:
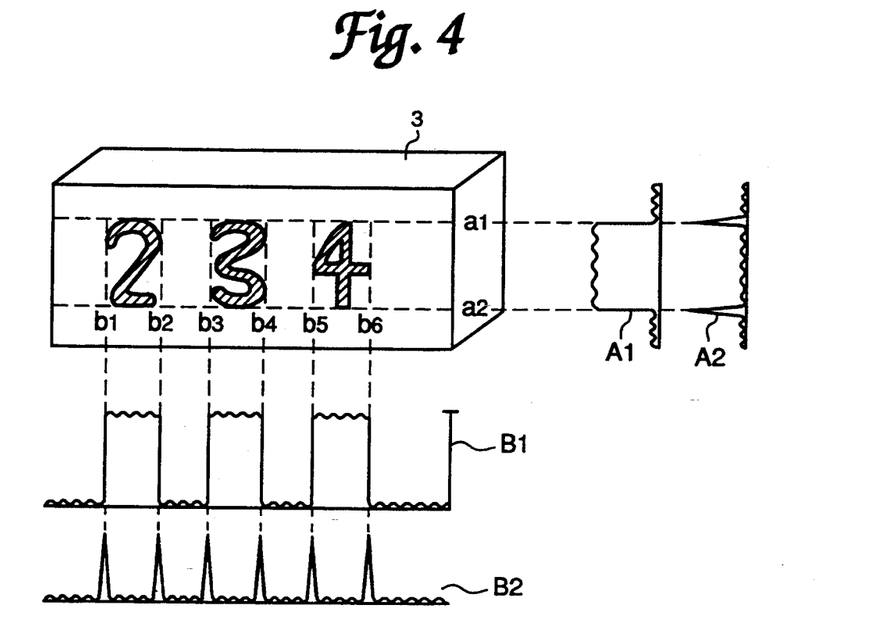
FIG. 4 illustrates the detection state for character position.

The differential data at (B2) as shown in FIG. 4 is obtained in the character detection unit (5) by differentially processing the maximum value data (B1). Then, the character positions in the line direction are detected from the maximum value of this differential data (B2).

The character images in the multi-value image memory (3) corresponding to the character line and character positions which have been detected in this way are transmitted to character identification unit (6), and each character unit is identified.

Figure 6:
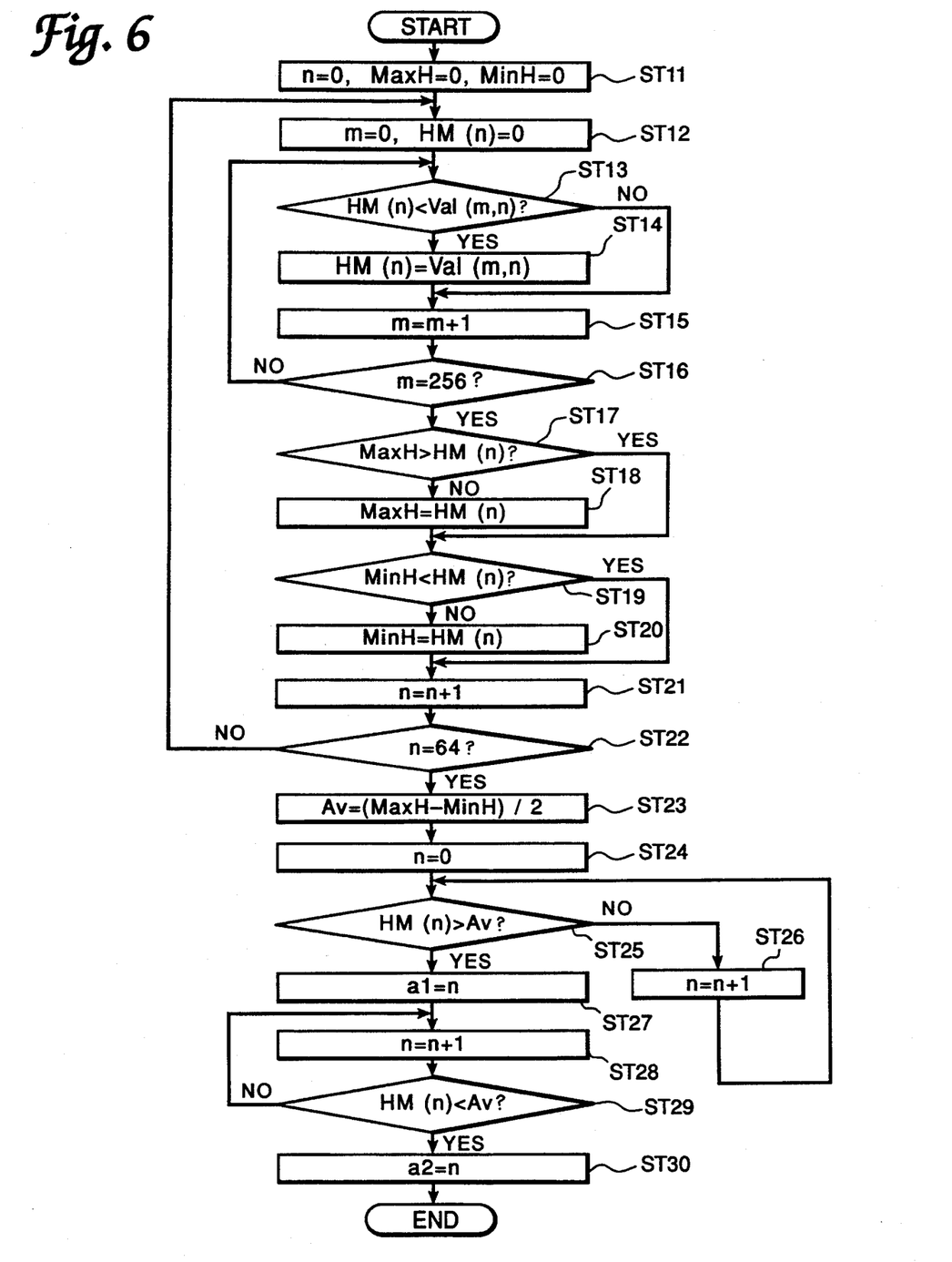
FIG. 6 is a flow chart of the character line detecting operation.
Figure 7:
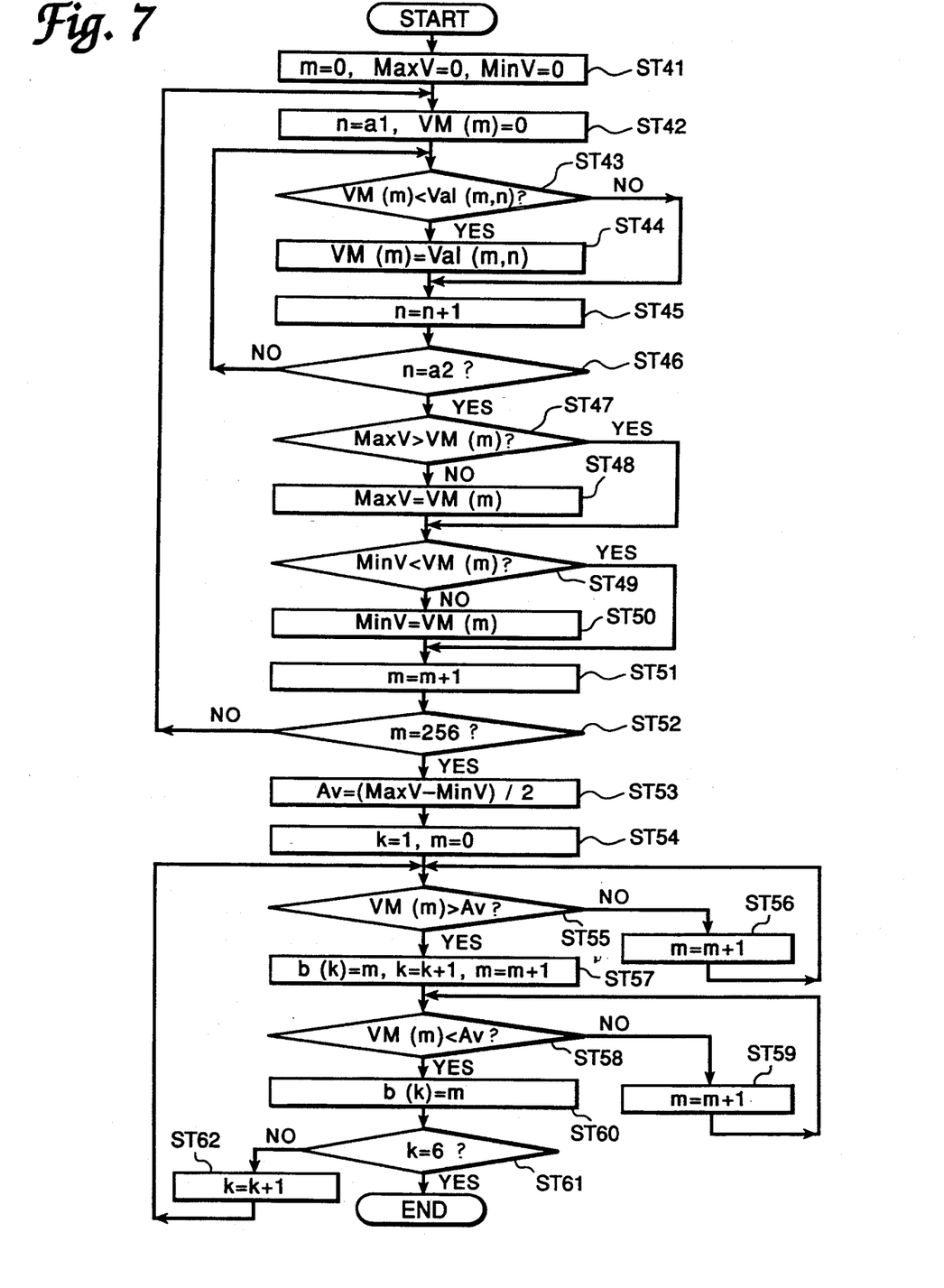
FIG. 7 is a flow chart of the character position detecting operation.

The above mentioned operation is described in further detail with reference to the flow-charts shown in FIG. 6 and FIG. 7. Multi-value image memory (3) is constructed to store the pixel data m in the horizontal direction from 0 to 255, and the pixel data n in the vertical direction from 0 to 63 as shown in FIG. 5. In FIG. 6, the counter n of pixel data in the vertical direction is cleared (ST11). Also in step ST11, the variables MaxH and MinH which detect maximum value data and minimum value data, respectively, for all scanning lines in the horizontal direction are also cleared. In step ST12, memory HM(n) which stores the maximum value of the nth line, and the pixel data counter m in the horizontal direction are cleared. In step ST13, maximum value memory HM(n) and the pixel value Val(m,n) of the m column and n line of the multi-value image memory are compared. When, as the result of the comparison, the pixel value of the multi-value image memory is greater, the maximum value memory HM(n) is renewed in step ST14. However, when the pixel value of the multi-value image memory is smaller, step ST15 is advanced to without renewing the maximum value memory HM(n). In step ST15, the content of counter m is incremented in order to check the next pixel data. It is determined in step ST16 whether pixel data for one line has been obtained (m=2557). If the pixel data for one line has not been obtained, as determined in step ST16, the operation returns to step ST13 and the comparison is made for the next pixel data.

If it is determined in step ST16 that counter m has reached 255, the horizontal scanning of one line has been completed, and the maximum value for this scanning line has been stored in memory HM(n). Next, in step ST17, comparison is made to determine whether the maximum value of this line is the maximum value for all lines stored in memory at that time. If it is the maximum value, horizontal direction maximum value MaxH is renewed in step ST18. If it is not the maximum value, comparison is made in step ST19 to determine whether it is the minimum value for all scanning lines stored in memory. If it is the minimum value, the direction minimum value data MinH is renewed in step ST20, and the step ST21 is performed.

In step ST21, counter n in the vertical direction is incremented and step ST22 determines whether all the lines have been completed (n=64?). If all the lines have not been completed, the operation returns to step ST12 and the maximum value for the next line is detected.

When the maximum values for all lines are detected, extraction of the character line is executed. In step ST23, a mean value Av of the horizontal direction maximum value data MaxH and the horizontal direction minimum value data MinH is calculated. The portion of the maximum value which is higher than the mean value Av is detected as the domain of the character line. Namely, in step ST24, the counter n for the vertical direction is cleared, and in step ST25 a check is made to determine whether the maximum value of each line is greater than the mean value Av. When the maximum value is less than the mean value, the counter n is incremented in step ST26, and the operation returns to step ST25. When the maximum value of a specific line is greater than the mean value Av, an indication that this line is the upper limit of the character line is stored in step ST27 (a1=n). The counter n is incremented in step ST28, and a check is made in step ST29 for a line whose maximum value is less than the mean value Av. An indication that the line whose maximum value is less than the mean value is the lower limit of the character line is stored in step ST30 (a2=n). By extracting maximum value and minimum value data for the horizontal direction, the domain of the character line is determined.

Next, the operation of character position detection by scanning multi-value image memory (3) in the vertical direction is described with reference to FIG. 7.

As in horizontal direction scanning, the pixel data counter m for the horizontal direction and the variables MaxV and MinV which detect the vertical direction maximum value data and the vertical direction minimum value data for all scanning columns in the vertical direction are cleared (ST41). Also, in step ST42, memory VM(m) which stores the maximum value of the mth line is cleared and counter n for the vertical direction is set at value a1 because, as mentioned above, the height of the character line was detected from a1 to a2. Therefore, the check for the vertical direction is performed only in the domain. Also, in step ST42, maximum value memory VM(m) which stores the maximum value of the mth column is also cleared. In step ST43, the maximum value memory VM(m) and the pixel value Val(m,n) of m column and n line of the multi-value image memory are compared. When, as the result of the comparison, the pixel value of the multi-value image memory is greater, the maximum value memory VM(m) is renewed in step ST44. However, when the pixel value of the multi-value image memory is smaller, the step advances to step ST45 without renewing the maximum value memory VM(m). In step ST45, the content of the counter n is incremented to check the next pixel data, and Step ST46 determines whether the lower limit of the character line has been reached (n=a2?). If the lower limit has not been reached the operation returns to step ST43 and the comparison is made for the next pixel data.

If counter n has reached a2 in step ST46, vertical scanning for one column has been completed, and the maximum value for this column has been stored in memory VM(m). Next, in step ST47, comparison is made to determine whether or not the maximum value of this column is the maximum value data for all columns stored in memory at that time. If it is the maximum value data, the vertical direction maximum value data MaxV is renewed in step ST48. If it is not the maximum value data, comparison is made in step ST49 to determine whether it is the minimum value data. If it is the minimum value data, the vertical direction minimum value data MinV is renewed in step ST50, and the step advances to step ST51.

In step ST51, counter m for the horizontal direction is incremented, and step ST52 checks whether all the columns have been completed (m=256?). If all the columns have not been completed, the operation returns to step ST42 and the maximum value for the next column is detected.

When the maximum value for all columns are detected, extraction of the character positions is executed. In this description, 3 characters are positioned as shown in FIG. 4, and their respective left ends and right ends are described as b(k) where k=1 to 6. In step ST53, a mean value Av of the vertical direction maximum value data MaxV and the vertical direction minimum value data MinV is calculated. The portions of the maximum value which are higher than the mean value Av are detected as the domain of the character positions. Namely, in step ST54, the counter m for the horizontal direction and the character position variable k are cleared. In step ST55, a check is made to determine whether the maximum value VM(m) of each column is greater than the mean value Av. When the maximum value is less than the mean value Av, the counter m is incremented in step ST56, and the next column is checked. When the maximum value VM(m) of a specific column is greater than the mean value, an indication that this column is the left end of a first character is stored in step ST57 (k=1). Also, counter m and variable k are incremented in step ST57. In step ST58, a check is made to detect a column whose maximum value VM(m) is less than the mean value Av. An indication that the column whose maximum value VM(m) is less than the mean value Av is the right end of the first character is stored in step ST60. This process is repeated in steps ST61 and ST62 for the 3 characters shown in FIG. 4 (until k=6) to obtain the positions of the second and third characters.

In the above embodiment, the detection of the maximum value for each scanning line has been described using an example wherein black characters are recorded on a white background recording medium. It is clear that, when white characters are recorded on a black background recording medium, the minimum value should be detected instead of the maximum value. In this case, the minimum value data can be detected in maximum value storage memory (13) by changing the maximum/minimum switching signal shown in FIG. 2 to "0". In either case, the peak value can be detected from the pixel data of each scanning line.

Figure 8:
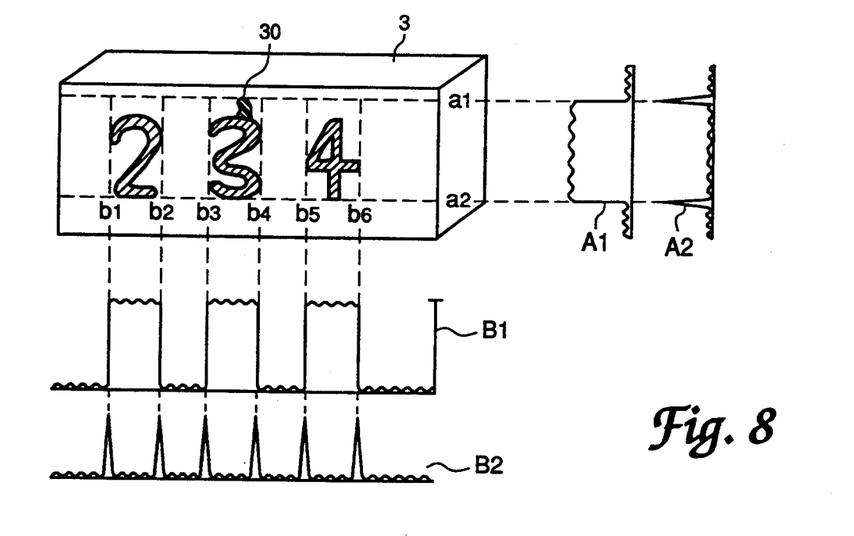
FIG. 8 illustrates the detection state when there is an imperfection on the recording medium.

Also, in the embodiment described above, if any imperfections (30) exist, as shown in FIG. 8, this results in detecting a character line having a range which includes the imperfection. In order to eliminate this problem, the following modification can be implemented.

Figure 9:
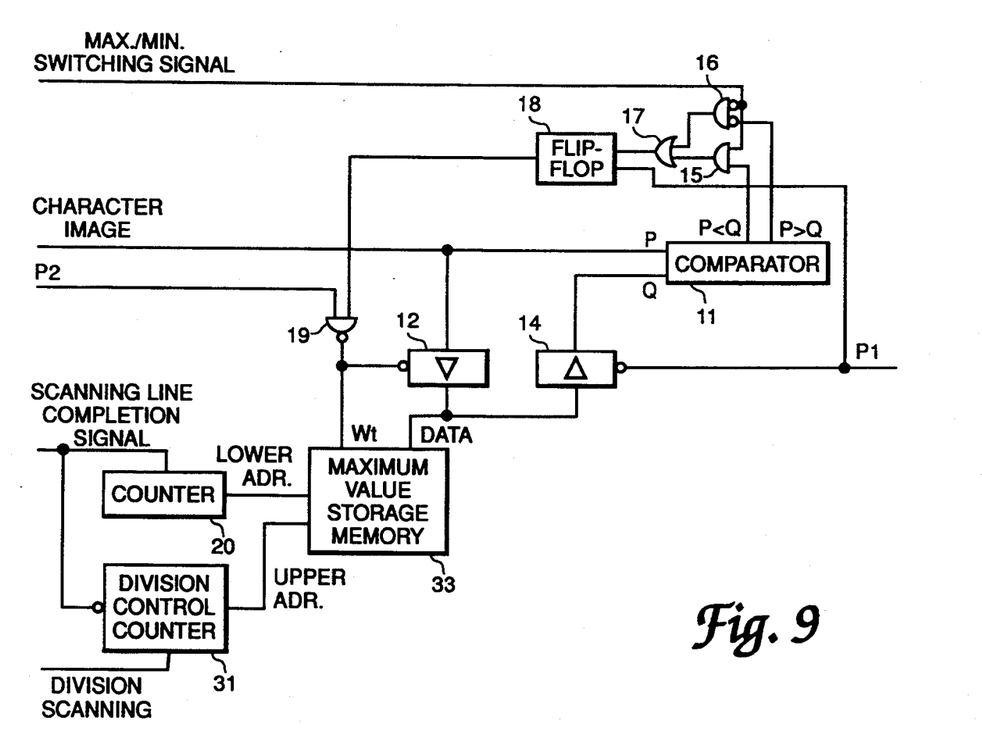
FIG. 9 is a block diagram of the maximum density value extraction unit of another embodiment.

Namely, the area in which the maximum value is to be detected is divided into multiple areas (for instance 8, areas DG1 through DG8) in the character line direction (see FIG. 9). Then, processing is executed by respectively scanning each of these divided areas and detecting the maximum value data in each divided area. The following is a detailed description with reference to FIG. 9.

Figure 10:
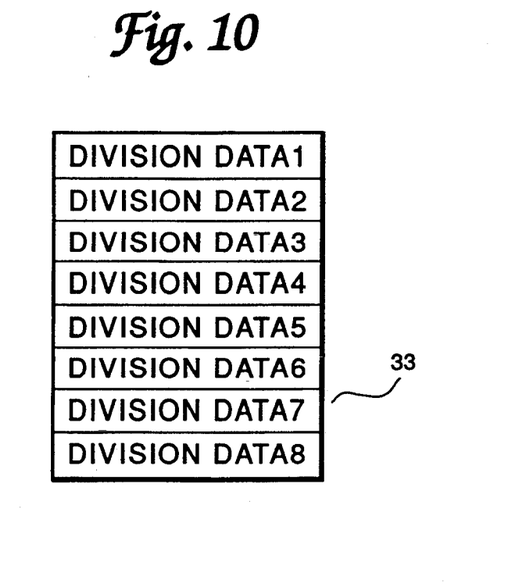
FIG. 10 shows the construction of the maximum value storage memory shown in FIG. 9.
Figure 11:
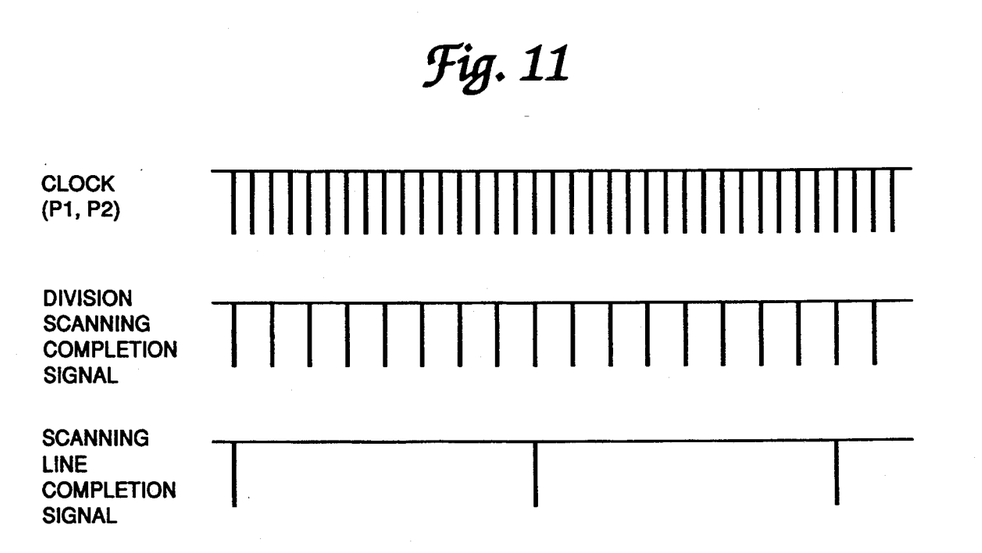
FIG. 11 is a timing chart used in FIG. 9.

FIG. 9 is similar to FIG. 2, however, maximum value storage memory (33) is divided into division data 1 through division data 8 as shown in FIG. 10. Also, in maximum value storage memory (33), the lower address is designated by counter (20) and the upper address is designated by division control counter (31). In counter (20) and division control counter (31), the pulses shown in FIG. 11 are supplied. Moreover, counter (20) is supplied with 8 division scanning completion signals for one scan of the multi-value image memory (3). Each of these division scanning completion signals corresponds to a respective divided area. Therefore, division control counter (31) is incremented and renews the upper address of maximum value storage memory (33) every time it is supplied with a division scanning completion signal. As a result, maximum values of the respective area are stored in the division data 1 through division data 8 of maximum value storage memory (33).

Figure 12:
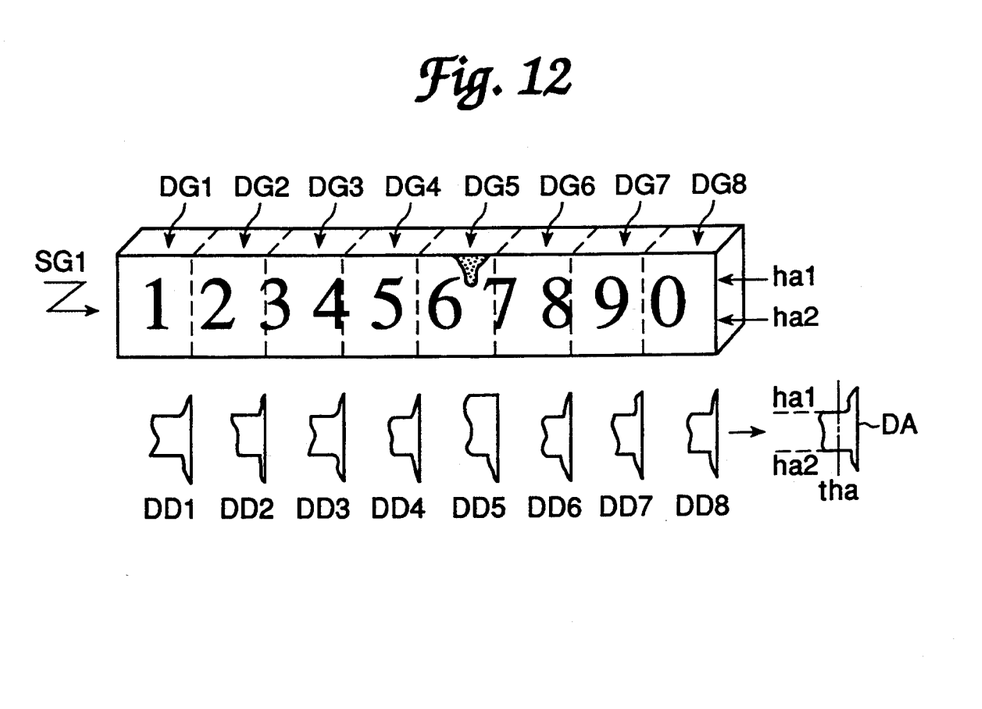
FIG. 12 illustrates the detection state for another embodiment.

According to this embodiment, maximum value data DD1 through DD8 are detected for each divided area DG1 through DG8, as shown in FIG. 12. An average value DA of the maximum value data DD1 through DD8 for each divided area DG1 through DG8 is then calculated. Then, by digitally converting the average value at a specified threshold level tha, character line ha1—ha2 can be detected. Therefore, even if an imperfection is adjacent to the characters, the character line can be detected accurately.

Figure 13:
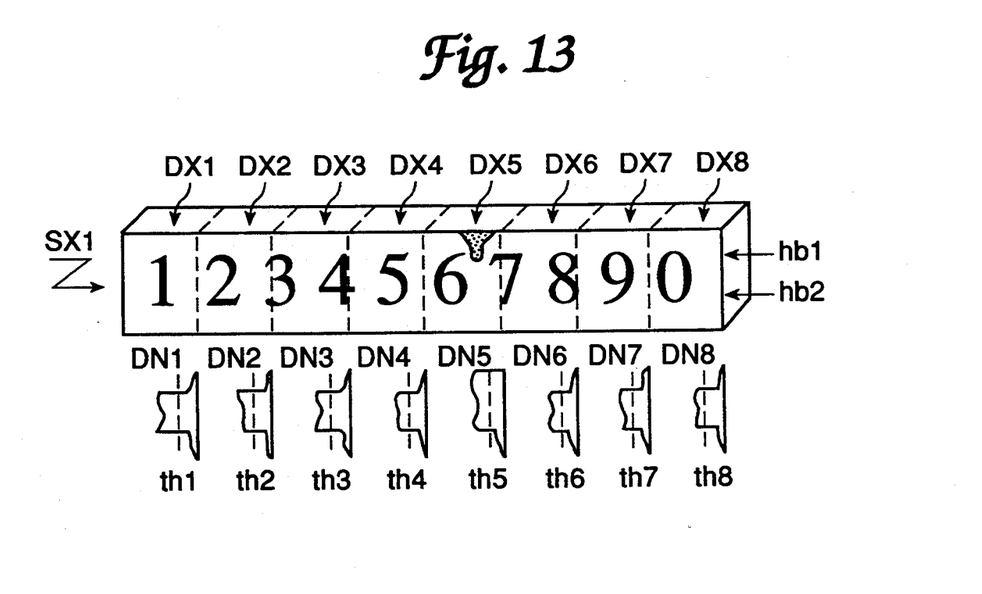
FIG. 13 shows the detection state for a further embodiment.

Also, another modification as shown in FIG. 13 can be considered. Namely, after the detection of the maximum value data DN1 through DN8 for each divided area DX1 through DX8, the respective maximum value data DN1 through DN8 are digitally converted at specified threshold levels th1 through th8. After this, by extracting only those which are approximately related to each other (DN1 through DN4, DN6 through DN8) and detecting the highest and lowest positions, character line hb1—hb2 can be detected.

Furthermore, detecting operation of the maximum value data has been described for both detection of character line and detection of character positions in the line direction. However, this technique may also be applied for either detection of character line or detection of character position alone.

Other embodiments of the invention will be apparent to the skilled in the art from consideration of the specification and practice of the invention disclosed herein. It is intended that the specification and embodiments be considered as exemplary only, with the true scope and spirit of the invention being indicated by the following claims.

What is claimed is:

1. A character reading apparatus for reading character images from a recording medium comprising a character image portion having said character images thereon and a non-character image portion, where each said character image has a specific identity, said character reading apparatus comprising:

means for reading said character images from said recording medium, comprising:

means for receiving light waves from said character and non-character image portions of said recording medium, and means for converting said received light waves into character image data and non-character image data for respectively representing said character and non-character image portions with a plurality of pixels arranged to form a plurality of lines and columns, said character and non-character image data defining each of said pixels as having one of a predetermined range of values, said values of said pixels defined by said character image data being larger than said values said pixels defined by said non-character image data; means for identifying a largest of said values of said pixels in each of said lines, said identifying means including:

means for storing said data defining said value of one of said pixels of one of said lines, and means for successively comparing each of said data defining said values of successive said pixels of said one of said lines with said data stored in said storing means and for replacing said data in said storing means with said data defining said value of one of said successive pixels when said value of said one of said successive pixels is determined to be larger than said value defined by said data in said storing means;

means for determining, in accordance with said largest values, which of said lines include pixels represented by said character image data and for identifying those said lines as character image lines; and means for identifying said specific identity of each of said character images based on said character image data representing said pixels in said character image lines.

2. A character reading apparatus for reading character images from a recording medium comprising a character image portion having said character images thereon and a non-character image portion, where each said character image has a specific identity, said character reading apparatus comprising:

means for reading said character images from said recording medium, comprising:

means for receiving light waves from said character and non-character image portions of said recording medium, and means for converting said received light waves into character image data and non-character image data for respectively representing said character and non-character character image portions with a plurality of pixels arranged to form a plurality of lines and columns, said character and non-character image data defining each of said pixels as having one of a predetermined range of values, said values of said pixels defined by said character image data being larger than said values of said pixels defined by said non-character image data; first means for identifying a largest of said values of said pixels in each of said lines, said first identifying means including:

means for storing said data defining said value of one of said pixels of one of said lines, and means for successively comparing each of said data defining said values of successive said pixels of said one of said lines with said data stored in said storing means and for replacing said data in said storing means with said data defining said value of said one of said successive pixels when said value of said one of said successive pixels is determined to be larger than said value defined by said data in said storing means;

first means for determining, in accordance with said largest values, which of said lines include pixels represented by said character image data and for identifying those said lines as character image lines;

second means for identifying, in accordance with said character and non-character image data, a largest of said values of said pixels in each of said columns;

second means for determining, in accordance with said largest values, which of said columns include pixels represented by said character image data and for identifying those said columns as character image columns; and means for identifying said specific identity of each of said character images based on said character image data representing said pixels in said character image lines and said character image data representing said pixels in said character image columns.

3. A character reading apparatus for reading character images from a recording medium comprising a character image portion having said character images thereon add a non-character image portion, where each said character image has a specific identity, said character reading apparatus comprising:

means for reading said character images from said recording medium, comprising:

means for receiving light waves from said character and non-character image portions of said recording medium, and means for converting said received light waves into character image data and non-character image data for respectively representing said character and non-character image portions with a plurality of pixels arranged to form a plurality of lines and columns, said character and non-character image data defining each of said pixels as having one of a predetermined range of values, said values of said pixels defined by said character image data being larger than said values of said pixels defined by said non-character image data;

first means for identifying, in accordance with said character and non-character image data, a largest of said values of said pixels in each of said lines:

first means for determining, in accordance with said largest values, which of said lines include pixels represented by said character image data and for identifying those said lines as character image lines;

second means for identifying a largest of said values of said pixels in each of said columns, said second identifying means including:

means for storing said data defining said value of one of said pixels of one of said columns, and means for comparing successive said data defining said values of successive said pixels of said one of said columns with said data stored in said storing means and replacing said data in said storing means with said data defining said value of one of said successive pixels when said value of said one of said successive pixels is determined to be larger than said value defined by said data in said storing means; second means for determining, in accordance with said largest values, which of said columns include pixels represented by said character image data and for identifying those said columns as character image columns; and means for identifying said specific identity of each of said character images based on said character image data representing said pixels in said character image lines and said character image data representing said pixels in said character image columns.

* * * * *